US 12,210,622 B1

United States Patent
Zhang et al.

(10) Patent No.: US 12,210,622 B1
(45) Date of Patent: Jan. 28, 2025

(54) DEEP SEQUENTIAL ANOMALOUS EVENTS DETECTION

(71) Applicant: Amazon Technologies, Inc., Seattle, WA (US)

(72) Inventors: Zhilu Zhang, Jersey City, NJ (US); Qian Cui, Sammamish, WA (US); Baris Coskun, Glen Rock, NJ (US); Wei Ding, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 18/065,481

(22) Filed: Dec. 13, 2022

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
None
See application file for complete search history.

(56) References Cited

U.S. PATENT DOCUMENTS

| 10,320,813 | B1  | 6/2019 | Ahmed et al. | |
|---|---|---|---|---|
| 2019/0297096 | A1 | 9/2019 | Ahmed et al. | |
| 2020/0076840 | A1* | 3/2020 | Peinador | G06F 21/552 |
| 2020/0285737 | A1* | 9/2020 | Kraus | G06F 21/552 |
| 2024/0007492 | A1* | 1/2024 | Shen | H04L 63/1425 |

OTHER PUBLICATIONS

AWS, "Amazon GuardDuty," downloaded from https://aws.amazon.com/guardduty/ on Dec. 20, 2022, pp. 1-8.
AWS, "AWS CloudTrail," downloaded from https://aws.amazon.com/cloudtrail/ on Dec. 20, 2022, pp. 1-7.
Ashish Vaswani, Noam Shazeer, Niki Parmar, Jakob Uszkoreit, Llion Jones, Aidan N Gomez, Łukasz Kaiser, and Illia Polosukhin. "Attention is all you need." In Advances in neural information processing systems, pp. 5998-6008, 2017.
Jacob Devlin, Ming-Wei Chang, Kenton Lee, and Kristina Toutanova. "Bert: Pre-training of deep bidirectional transformers for language understanding," arXiv preprint arXiv:1810.04805, Version 2 2019, pp. 1-16.

(Continued)

*Primary Examiner* — Anh Nguyen
(74) *Attorney, Agent, or Firm* — Alexander A. Knapp; Kowert, Hood, Munyon, Rankin & Goetzel, P.C.

(57) ABSTRACT

Systems and methods for performing anomalous activity monitoring for a service provider network are disclosed. In response to receiving an activity log, a machine learning-based activity monitor may parse the activity log into segments, generate event objects from a segment of the activity log, encode the event objects, and then reconstruct the event objects based on decoding the encoded event objects. The encoding and decoding may be performed based on a model that was trained using training data with no known malicious activity. The event objects may comprise at least two or more event defining characteristics and an event count. By comparing the reconstructed event objects to corresponding initial versions of the event objects, the machine learning-activity monitor may determine an anomaly score and may provide an indication of events determined to be anomalous based on the score.

20 Claims, 9 Drawing Sheets

(56) References Cited

OTHER PUBLICATIONS

Min Du, Feifei Li, Guineng Zheng, and Vivek Srikumar. "Deeplog: Anomaly detection and diagnosis from system logs through deep learning." In Proceedings of the 2017 ACM SIGSAC Conference on Computer and Communications Security, pp. 1285-1298, 2017.

Ian Goodfellow, Yoshua Bengio, and Aaron Courville. "Deep learning". MIT press, Oct. 3, 2015, pp. 1-705.

Min-hwan Oh and Garud Iyengar. "Sequential anomaly detection using inverse reinforcement learning." In Proceedings of the 25th ACM SIGKDD International Conference on Knowledge Discovery & Data Mining, pp. 1480-1490, 2019.

Noveen Sachdeva, Giuseppe Manco, Ettore Ritacco, and Vikram Pudi. "Sequential variational autoencoders for collaborative filtering". In Proceedings of the Twelfth ACM International Conference on Web Search and Data Mining, pp. 600-608, 2019.

U.S. Appl. No. 18/066,885, filed Dec. 15, 2022, Michael James Morais.

U.S. Appl. No. 17/809,519, filed Jun. 28, 2022, Christopher B. McCubbin.

* cited by examiner

DEEP SEQUENTIAL ANOMALOUS EVENTS DETECTION

BACKGROUND

Many enterprises employ security detection tools that generate security alerts or findings on their computer networks. These security detection tools fall into categories such as Intrusion Detection System (IDS), Security Information and Event Management (SIEM), User and Entity Behavior Analytics (EUBA), Cloud Access Security Broker (CASB), Next Generation Firewall (NGFW), Web Application Firewall (WAF), and other types of systems. These systems are generally designed to analyze huge volumes of log data collected from the computer networks to detect actions, events, or conditions that indicate Tactics, Techniques and Procedures (TTPs) of potential cyberattacks. Such systems may scrutinize logs for different types of malicious activity by evaluating each event individually against a set of rules that have been developed to identify malicious activity.

While extremely valuable, such systems may have shortcomings when deployed on large enterprise networks. Given the limited visibility of a particular security detection system and the high volume of data generated by large enterprise networks, the alerts produced by the systems may include a large number of false positives that were triggered by benign user activities. Conversely, such systems may be adjusted to generate fewer false positives, but such adjustments may result in at least some malicious activity going undetected.

While embodiments are described herein by way of example for several embodiments and illustrative drawings, those skilled in the art will recognize that embodiments are not limited to the embodiments or drawings described. The drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components.

"Configured To." Various units, circuits, or other components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on). The units/components used with the "configured to" language include hardware—for example, circuits, memory storing program instructions executable to implement the operation, etc. Reciting that a unit/component is "configured to" perform one or more tasks is expressly intended not to invoke 35 U.S.C. § 112, paragraph (f), for that unit/component. Additionally, "configured to" can include generic structure that is manipulated by software or firmware to operate in manner that is capable of performing the task(s) at issue.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

It will also be understood that, although the terms 1, 2, N, etc. may be used herein to describe various elements, these elements should not be limited by these terms. These terms are only used to distinguish one element from another. For example, a component with the term 1 could be termed a second component, and, similarly, a component with the term 2 could be termed a first component, without departing from the scope of the present invention. The first components and the second component are both components, but they are not the same components. Also, the term N indicates that an Nth amount of the elements may or may not exist depending on the embodiments.

DETAILED DESCRIPTION OF EMBODIMENTS

Anomalies and malicious events from cyber-attacks are significant problems in cybersecurity. Although many sophisticated security detection tools exist for monitoring large computer networks, current services monitor and analyze each event independently. While an event may seem normal or not malicious by itself, some anomalies may be better detected in relation to other events. For example, an event of deleting a file would normally not be considered anomalous but when thousands of other files have also been deleted during the same period, the whole sequence of events may be viewed as anomalous and/or malicious. Thus, analyzing a sequence of events together may improve accuracy and decrease the number of false positives that occur and/or reduce the prevalence of malicious activity that goes undetected.

To address these issues and/or other issues, this application describes a system that implements machine learning-based monitoring and analysis of activity log data, wherein events in a log are evaluated as one or more event sequences instead of (or in addition to) each event of the log being evaluated independently. In some embodiments, an activity log includes a record of events that users perform when interacting with a device or service. Also, the activity log may include events initiated by the device or service, for example, in response to user activity. In some embodiments, a malicious activity detection system may detect anomalous activity from a segment of events in an activity log and provide an indication of the anomalous activity. Thus, the malicious activity detection system may not only take into account attributes of individual events, but may also take into account patterns of events and event attributes occurring within the segment of the activity log. For example, as explained in the example above, while a file deletion event in and of itself may not appear malicious, repeated occurrences of file deletion events in a short period of time (e.g., within a given segment) may appear malicious. Thus, activity that when viewed in isolation appears benign may actually be used to detect anomalous and/or malicious activity when evaluated across a set of events included in a segment of an activity log.

In some embodiments, to train a machine learning-based activity monitor, a malicious event-free activity log may be used by a machine-learning model generator included in the machine learning-based activity monitor. The machine-learning model generator may use the malicious event-free activity log (e.g., training data) to train a model that can be used to generate an encoder model and a decoder model based on the malicious event-free activity log. The trained encoder and decoder models are then provided a respective encoder and decoder for use in performing anomalous activity detection. Each model may be used for the performance of the encoder and decoder respectively.

In some embodiments, the malicious event-free activity log (e.g., training data) may be gathered by an operator of an activity monitoring system or may be provided by a third party as known malicious event-free activity. In some embodiments, the malicious event-free nature of the training data may be determined based on real-world use. For example, real-world activity logs for which no malicious activity was detected and for which no users reported malicious activity may be used as training data. Note that the training data may be known to not include any "known" anomalous or malicious activity. However, when using real-world data there is a possibility that a small amount of malicious activity may go undetected and un-reported. To address this possibility, the encoder and decoder may be trained using multiple sets of malicious event-free activity logs and training may be updated over time to account for the detection of previously undetected malicious or anomalous activity. In some embodiments, during the monitoring of activity logs, a service may provide an activity log to a machine learning-based activity monitor. The activity log may be parsed into segments, wherein each segment contains a plurality of events.

Based on a segment of the activity log, event counts may be determined, and event objects may be generated from the events in the activity log. An event count may represent the number of times a unique event occurs during the activity log. A unique event may be measured by the number of same unique event identifiers. Each event object may include the unique event identifier and the event count. The event identifier may comprise but is not limited to two or more event defining characteristics. Examples of event defining characteristics include an IP address, an error code, or an application programming interface (API) name. For example, a delete event originating from a given IP address and directed to a given API interface may be classified as a unique event. When a large number of such delete events, all originating from the same IP address and directed to the same given API interface occur in a sequence, the number of such occurrences may be counted to generate an event count for the unique event. However, other delete events originating from other IP addresses or directed to other API interfaces may constitute other unique events with their own respective event counts in the segment.

Once the event objects have been generated; the event objects then may be concurrently encoded using an encoder (that has been trained using malicious event-free activity logs, as described above). The encoded event objects may be concurrently reconstructed by using a decoder, and the decoded event objects may be compared with the initial event objects to determine anomaly scores for each of the event defining characteristics and the event count. Other event characteristics may be provided into the machine learning-based activity monitor as context information. The other event characteristics may comprise, as a few examples, a username, a user type, a user agent, and/or an account ID. Context information may be used to aid the machine learning-based activity monitor when comparing the decoded event objects and the initial event objects. For example, if the sequence of events includes deleting a thousand files and the context information comprised a username that often deletes thousands of files at time, then the context information may affect the outcome of the anomaly score.

Note that because the encoder and decoder are using models that have been trained using malicious event-free activity logs, the encoder and decoder should recreate the initial event objects when encoded and decoded, if the events conform to assumptions used to train the models (e.g., a lack of malicious events). However, if the event objects being encoded and decoded include malicious activity, the reconstructed versions of the event objects (e.g., after encoding and decoding) will vary from the initial versions of the event objects. This is because the encoder and decoder were not trained on events with malicious activity and will therefore introduce some amount of distortion or loss when encoding and decoding the event objects. The degree to which the event objects are distorted can be quantified to determine whether or not the events of a given segment include anomalous and/or malicious activity.

In some embodiments, an individual anomaly score may be determined for each identifier of a unique event object. In some embodiments, the anomaly score may be determined based on comparing an initial value of the event identifier (prior to encoding and decoding) to a reconstructed value of the event identifier (e.g., after encoding and decoding). A difference or ratio of the initial and reconstructed values of the event identifiers may be used to generate an anomaly score for the respective event identifiers.

In some embodiments, an anomaly score determinator may use the individual anomaly scores for event identifiers of a unique event to determine a total anomaly score for the unique event. Continuing the example of the delete event unique event from above, an overall anomaly score may be determined based on individual anomaly scores for event identifiers of the unique event, such as the IP address originating the delete activities, the event name (e.g., "deletes") and the count. For example, if the pre-reconstruction IP address, the pre-reconstruction event name, and the pre-reconstruction event count closely match the reconstructed IP address, the reconstructed event name, and the reconstructed event count, then it may be assumed that delete events from the given IP address in the given count quantity were within ranges experienced in the training data and therefore are not anomalous. However, if there is encoding/decoding loss (e.g., distortion) in the reconstructed IP address, the reconstructed event name, or the reconstructed event count, then it can be inferred that the loss/distortion is due to the model being presented with activity that deviates from the activity used to train the model (e.g., malicious event-free activity). Thus, it can further be inferred that the activity which, when encoded and reconstructed, does not match the pre-reconstruction activity event identifiers is activity that includes anomalous and/or malicious activity.

For example, in the circumstance of thousands of files being deleted (e.g., the example from above), the malicious-free event activity log used for training may be unlikely to comprise a high event count from deleting thousands of files. In this example, the models used by the encoder and decoder may cause the encoders and decoder to reconstruct the final output (e.g., the decoded event objects) differently from the original input (the event objects). Therefore, the total anomaly score may indicate malicious activity. In contrast, an event activity log with a smaller number of deletes originating from the same IP address and directed to the same API interface may be within ranges included in the malicious-free event activity log and therefore may not result in a high anomaly score as is the case with higher event count.

In some embodiments, the total anomaly score may be sent to a response engine to provide an indication of anomalous activity to recipients. For example, a response engine may send an indication to an account administrator indicating possible anomalous activity. In some embodiments, an anomaly score may be sent to various recipients, such as an administrator, a user, another monitoring system, etc. In some embodiments, a higher-level system may use anomaly scores along with other types of security monitoring information to make a response decision. Indicated anomalous activity may be represented by an increased anomaly score. Activity that is not anomalous may be represented by a lower anomaly score, e.g., closer to zero. Though various other scales may be used, some of which may include log scales, positive and negative values, etc. In some embodiments, recipients of an indication of anomalous activity may include the service providing the activity log, other services in the service provider network, or a separate network that communicates with the service provider network and clients, as a few examples.

As will be appreciated by those skilled in the art, features of the system disclosed herein may be implemented in current computer systems to solve existing technical problems in the state of the art and to improve the functioning of the current systems. These and other features and advantages of the disclosed system are discussed in further detail below, in connection with the figures.

Figure 1:
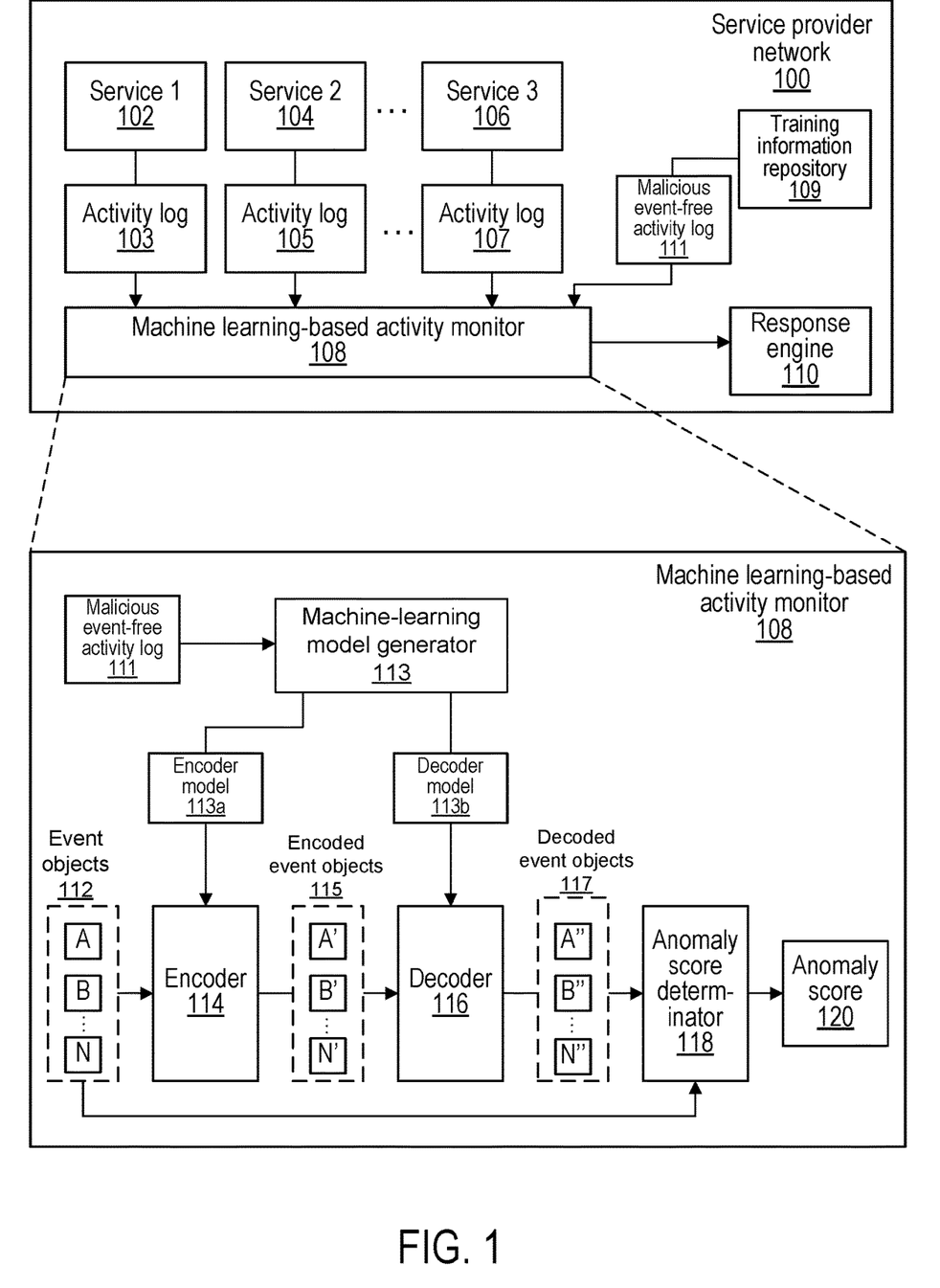
FIG. 1 is a block diagram illustrating a service provider network, wherein services of the service provider network provide activity logs to a machine learning-based activity monitor module that determines an anomaly score based on the activity logs, wherein the anomaly score is determined by encoding and decoding event objects from the activity logs through a machine learning based model, according to some embodiments.

FIG. 1 is a block diagram illustrating a service provider network, wherein services of the service provider network provide activity logs to a machine learning-based activity monitor module that determines an anomaly score based on the activity logs, wherein the anomaly score is determined by encoding and decoding event objects from the activity logs through a machine learning based model, according to some embodiments.

In some embodiments, monitoring of activity logs, such as by machine learning-based activity monitor 108 of service provider network 100, may resemble embodiments as shown in FIG. 1. In some embodiments, services such as service 1 (102), service 2 (104), and service 3 (106) may provide activity logs (103, 105, 107 respectively) to a machine learning-based activity monitor 108. The activity logs 103, 105, and 107 may comprise events occurring on or in relation to the respective services. In such embodiments, to perform the activity monitoring for one or more of the services 102, 104, or 106, the machine learning-based activity monitor 108 may output an anomaly score 120 based on one of the respective activity logs 103, 105, or 107 to a response engine 110. The machine learning-based activity monitor 108 may be trained, as discussed above, based on a malicious event-free activity log 111 sent from a training information repository 109. A malicious event-free activity log 111 may represent an activity log without any known anomalous activity. An example of a malicious event may be a user agent from an IP address that is not typical of the username attempting to change the password of said username over 10 times, as one of various examples of anomalous or malicious activity. The malicious event-free activity log 111 may not be known to include any such anomalous or malicious activity. As discussed above, in some embodiments, the event-free activity log 111 may include real-world activity logs for which no malicious activity was detected or reported.

In some embodiments, to train the machine learning-based activity monitor 108 to perform the activity monitoring, the malicious event-free activity log 111 may be provided to the machine learning model generator 113, which then may output an encoder model 113a and a decoder model 113b based on the malicious event-free activity log 111 that has been provided. In such embodiments, the encoder model 113a and the decoder model 113b may be provided to an encoder 114 and decoder 116 respectively for use in performing live activity monitoring. Training the machine learning-based activity monitor 108 may occur before any activity monitoring has begun and may also be updated concurrently with the performance of activity monitoring. For example, an updated model may be generated using updated training data while a previously generated model is used to perform activity monitoring. Retraining may occur over time as the machine learning-based activity monitor 108 updates.

In some embodiments, to perform the machine learning-based activity monitoring, the activity logs 103, 105, or 107 may be parsed into multiple segments, wherein each segment includes multiple events. Event counts may then be determined for each unique event of a segment. In such embodiments, for each of the segments, event objects 112 may be generated and concurrently inputted into the encoder 114. In some embodiments, each event object of the event objects 112 includes an event identifier and an event count.

In some embodiments, the event identifier may comprise at least two event identifying characteristics of a unique event in a segment of the activity log. Such event identifying characteristics may include but are not limited to an IP address, an error code, or an API name. The IP address may provide information of where the unique event originated from. A binary value may provide if an error code was deployed in response to the unique event. An API name may provide information regarding a target of an action associated with the event because an API can be described as a mechanism that enable two software components to communicate with each other. An event count may be determined by the volume of unique events that occur during the segment of the activity log 103, 105, or 107. For example, an event object may include an IP address, an API name, and an event count. The event count of this example may be the number of events that originated from the same IP address and targeted the same API.

Using the encoder model 113a, the encoder 114 may compress and/or encode the event objects 112. For example, encoders encode the event objects by taking incoming data and reducing the complexity by multiple layers inside a neural network, resulting in a compressed version of the original data. A neural network may work as a series of algorithms that recognizes underlying relationships in the incoming data. Encoded event objects 115 may then be reconstructed by concurrently decoding the encoded event objects 115 by the decoder 116. The decoder 116 may decode the event objects in a similar way they have been encoded (e.g., based on a similar model). Decoded event objects 117 and the initial event objects 112 may then be inputted into an anomaly score determinator 118 to output the anomaly score 120. The anomaly score 120 may be determined based on differences between the initial event objects 112 and the decoded event objects 117.

Figure 2:
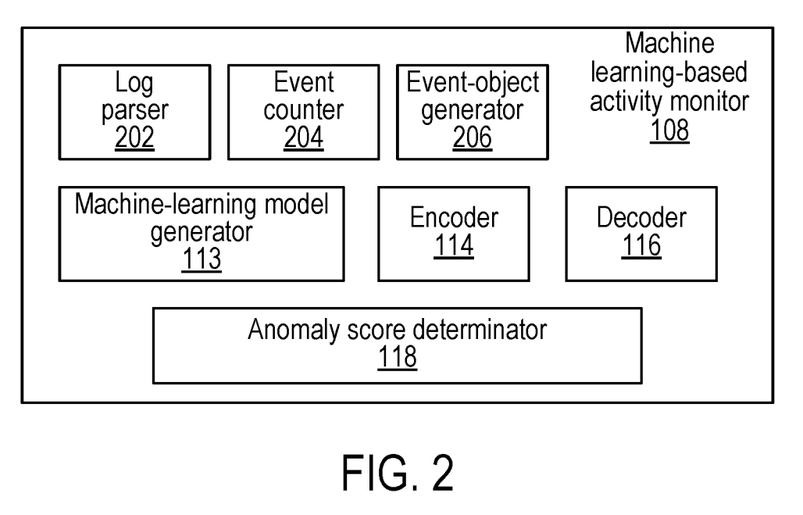
FIG. 2 is a block diagram illustrating example components of a machine learning-based activity monitor module that may be used to perform anomalous activity monitoring, according to some embodiments.

FIG. 2 is a block diagram illustrating example components of a machine learning-based activity monitor module that may be used to perform anomalous activity monitoring, according to some embodiments.

Some embodiments, such as shown in FIG. 1, may include further features such as shown in FIG. 2. For example, in some embodiments, activity monitoring, such as those described herein, may be performed using a machine learning-based activity monitor that may use components, such as in FIG. 2. In such embodiments, the machine learning-based activity monitor 108 may include further components such as, log parser 202, event counter 204, event-object generator 206, machine-learning model generator 113, encoder 114, decoder 116, and anomaly score determinator 118. A person having ordinary skill in the art should understand that the machine learning-based activity monitor 108 may include other components not listed.

In some embodiments, the log parser 202, when executed, may cause the machine learning-based activity monitor 108 to separate the activity log 103, 105, or 107 into multiple segments. In some embodiments, an activity originator may be identified for each of the plurality of events based on event characteristics. An activity originator may represent an operator of an event. For example, event characteristics such as an IP address, a username, or an account ID may be used to identify activity originators. In such embodiments, parsing of the activity log 103, 105, or 107 into segments may occur for each of the activity originators. In some embodiments, the activity log 103, 105, or 107 may be separated into segments by time, or based on other criteria. For example, the log parser 202 may divide an activity log into the segments by intervals of every 5 seconds, as an example. In other embodiments, the activity log 103, 105, or 107 may be separated by a set number of events (e.g., not strictly time related). For example, the log parser 202 may divide an activity log into segments by every 100 events that occur during the activity log. In some embodiments, the division of events into segments may maintain the ordering of the events. For example, the 100 events may be sequential events in the log, or the events occurring every 5 seconds may be sequential events in the log. In some embodiments, once the segments are generated the ordering of the events may be altered. For example, the events occurring every 5 seconds may be included in a same segment but are not necessarily required to be ordered sequentially in the given segment (though they may be ordered sequentially). In some embodiments, the event counter 204, when executed, may cause unique events in a segment of the activity log 103, 105, or 107 to be counted so there are counts for each unique event. The event-object generator 206, when executed, may cause an event object to be generated for each unique event in a segment of the activity log 103, 105, or 107, in some embodiments. The event objects 112 may then be concurrently inputted into the encoder such as shown in FIG. 1.

Machine-learning model generator 113, when executed, may cause the machine learning-based activity monitor to generate a trained model for use by the encoder 114 and the decoder 116. In some embodiments, training may occur by inputting a malicious event-free activity log 111 into the machine learning-model generator 108. The machine-learning model generator 113 then may generate and provide an encoder model 113a and a decoder model 113b to the encoder 114 and the decoder 116 respectively that has been trained on the malicious event-free activity log 111 such as shown in FIG. 1. In some embodiments, the encoder 114 and decoder 116 may be able to accurately reconstruct events and event identifiers that conform to patterns included in the malicious event-free activity log 111 using the encoder and decoder models 113. In such embodiments, the anomaly score determinator 118 may output a low anomaly score to indicate there are no anomalous events. By using the encoder and decoder models 113, any activity logs that contain anomalous activity may cause the anomaly score determinator 118 to output a higher anomaly score (e.g., higher than an anomaly score returned for non-anomalous events). In some embodiments, events with an associated anomaly score greater than a threshold value may be deemed anomalous. In some embodiments, an administrator, operator, or other user, may adjust the threshold to adjust a sensitivity with regard to detection of anomalous events of the machine learning-based activity monitor 108.

Figure 5:
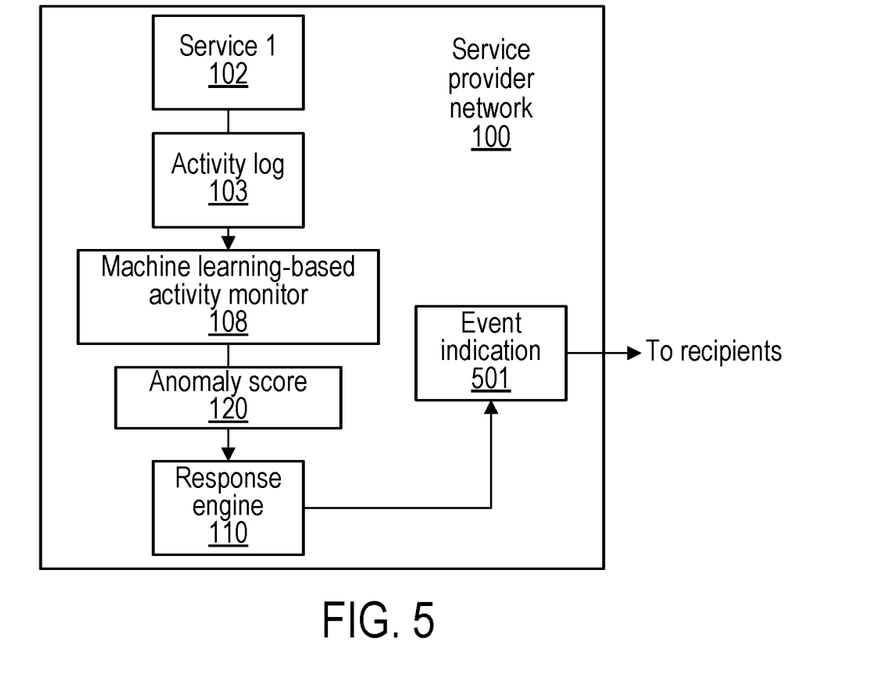
FIG. 5 is a block diagram illustrating a service provider network, wherein after anomalous activity monitoring is performed, a response engine outputs an event indication to send to recipients, according to some embodiments.
Figure 6:
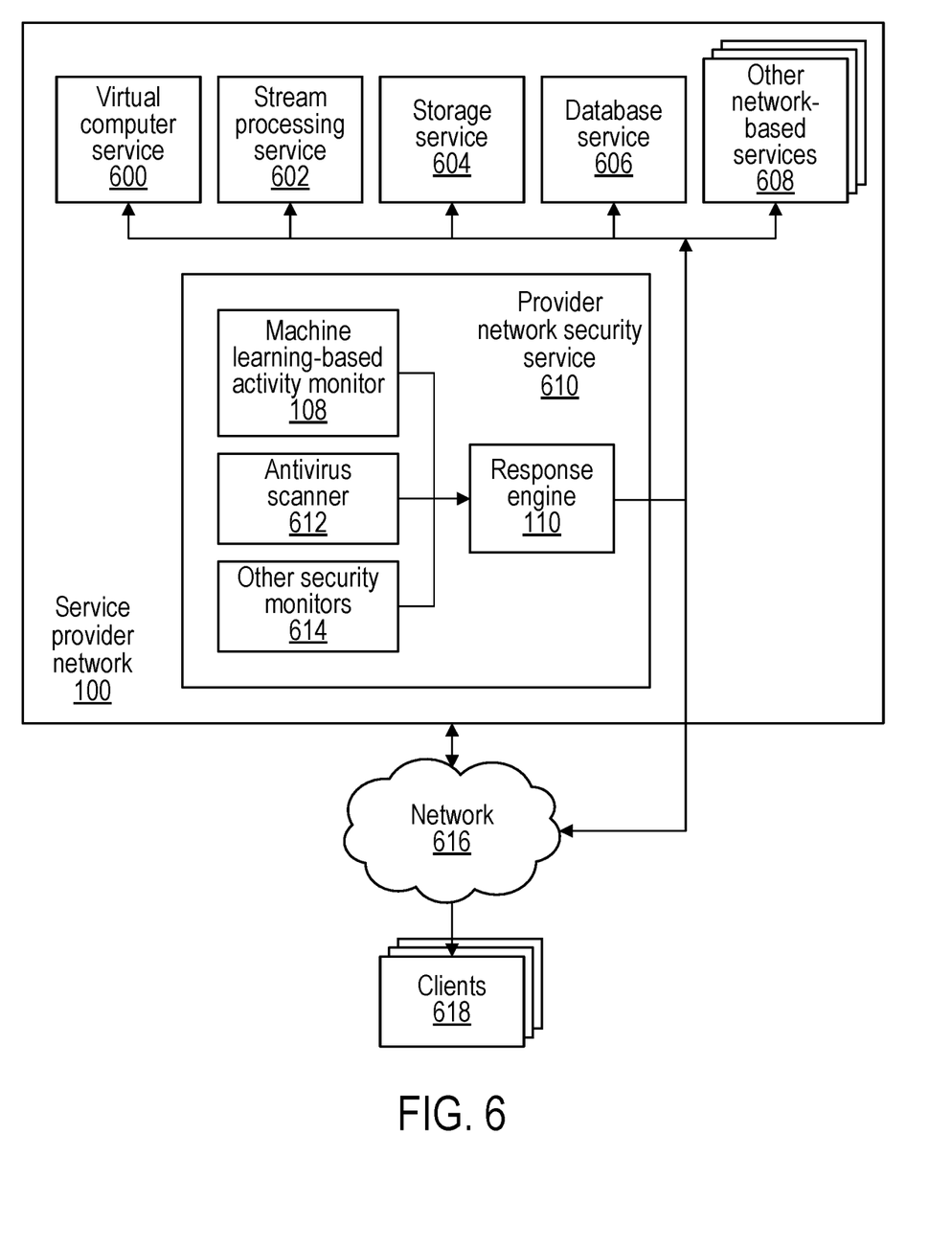
FIG. 6 is a block diagram illustrating a service provider network, wherein after security service monitoring is performed, a response engine outputs information to services in the service provider network and to another separate network that communicates with the service provider network and clients, according to some embodiments.

The encoder 114, when executed, may encode the event objects 112 to output encoded event objects 115 by using the encoder model 113a as shown in FIG. 1. An example of an encoder may be a transformer or a Long Short-Term Memory (LSTM). A transformer is a type of neural network structure that may encode the event objects 112 by processing the event objects 112 all at once which also allows the transformer to train on high volumes of input. The Long Short-Term Memory (LSTM) is a type of neural network structure that may encode the event objects 112 sequentially since they may be able to process the entire sequence of the event objects 112. The encoded event objects 115 may then be decoded by the decoder 116, when executed, based on the decoder model 113b to output the decoded event objects 117, shown in FIG. 1. When executed, the anomaly score determinator 118 may use the decoded event objects 117 outputted by the decoder 116 to determine the anomaly score 120 as shown in FIG. 1. The anomaly score determinator 118 may use a formula, as shown below, to determine the anomaly score 120:

$$\text{anomaly score} = -\left( \frac{\log p(DC1 \mid \varepsilon)}{T_{DC1}} + \frac{\log p(DC2 \mid \varepsilon)}{T_{DC2}} \ldots + \frac{\log p(DCN \mid \varepsilon)}{T_{DCN}} + \frac{\log p(\text{count} \mid \varepsilon)}{T_{count}} \right)$$

Where DC1, DC2, DCN, respectively, represent a first defining characteristic, a second defining characteristic, an nth defining characteristic, etc. of the unique event object. Also, the event count for the unique event object may further be used in the anomaly score. In the above equation, $T_{DC1}$, $T_{DC2}$, $T_{DCN}$, and $T_{count}$ represent a threshold value for each of the defining characteristics and event count. The threshold values may be used to normalize each of the numerator values. For example, if the numerator value of the event count is much higher only due to the fact that the event count normally has larger dimensions than the other numerator values, then the score may be balanced unequally towards the event count value. By using the threshold values, each anomaly score may be weighted proportionally for each numerator to determine the total anomaly score. The numerator values equal the log of the reconstruction probability of the defining characteristics or event count that appeared in the training data. The anomaly score determinator 118 may then output the anomaly score 120 to recipients as shown in FIGS. 5-6.

Figure 3:
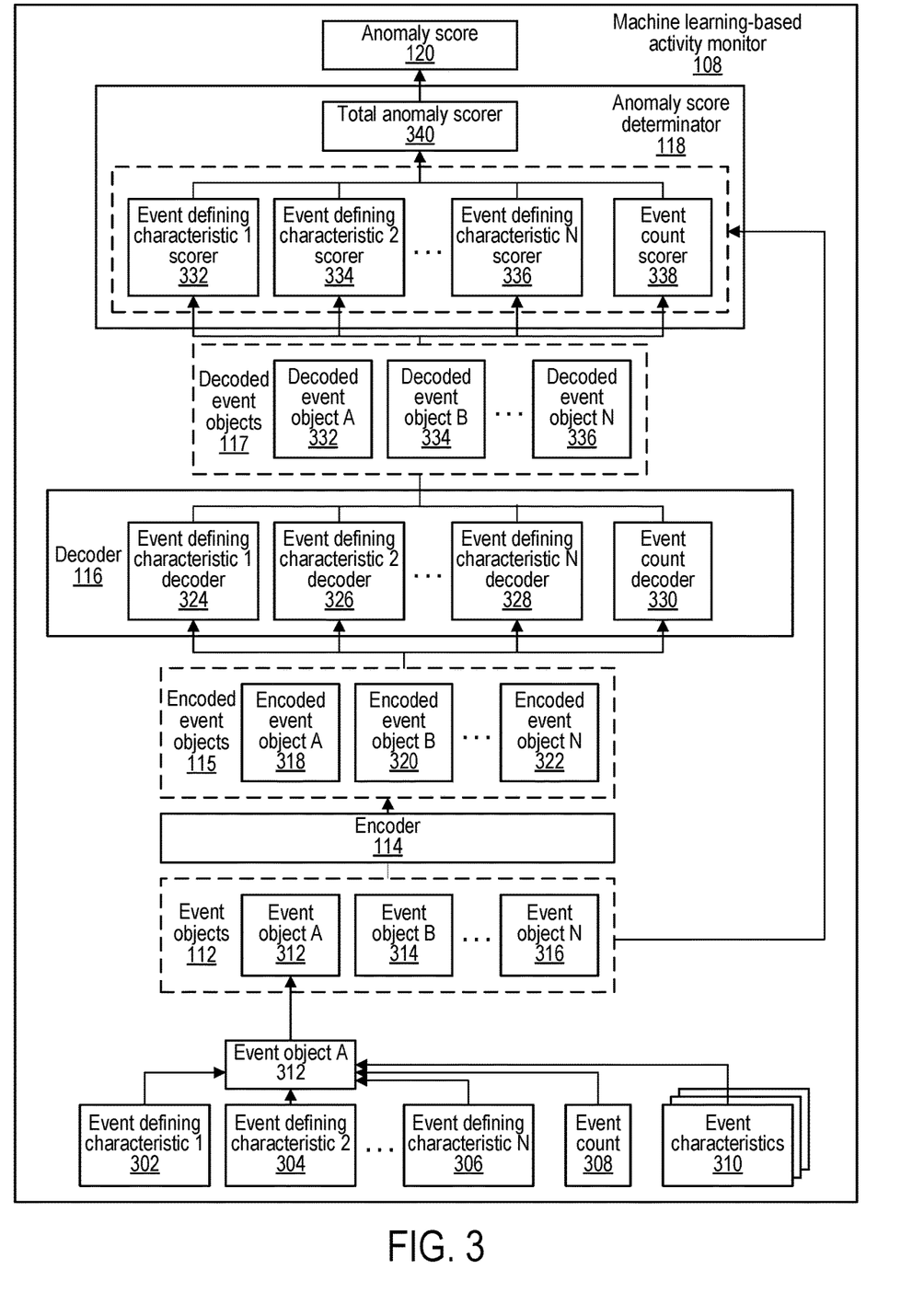
FIG. 3 is a block diagram illustrating event objects encoded and decoded concurrently to determine an anomaly score of an activity log, wherein the anomaly score is determined based on comparing the decoded event objects and the initial event objects, according to some embodiments.

FIG. 3 is a block diagram illustrating event objects encoded and decoded concurrently to determine an anomaly score of an activity log, wherein the anomaly score is determined based on comparing the decoded event objects and the initial event objects, according to some embodiments.

In some embodiments, such as shown in FIGS. 1 and 2, machine learning-based activity monitor 108 may implement further features to perform activity monitoring such as shown in FIG. 3. In some embodiments, each event object of the event objects 112 may include, but is not limited to, at least two event defining characteristics along with an event count, and (optionally) other event characteristics. For example, in FIG. 3, event object A 312 comprises components including event defining characteristic 1 (302), event defining characteristic 2 (304), event defining characteristic N (306), event count 308, and event characteristics 310.

Event object A 312 may be part of a group of event objects 112 such as event object B 314 and event object N 316 wherein all the event objects may be concurrently encoded by the encoder 114. Encoded event objects 115 may comprise encoded event object A 318, encoded event object B 320, and encoded event object N 322. Encoded event object A 318 may represent the encoded version of the event object A 312, encoded event object B 320 may represent the encoded version of event object B 314, and encoded event object N 322 may represent the encoded version of event object N 316. In such embodiments, each encoded event object may match to their corresponding event object. The same principle may be applied for the description of the decoded event objects 117. However, as explained above encoding/decoding losses may result when the event objects are outside the patterns of the training data, where these encoding/decoding losses are used to determine an anomaly score.

In some embodiments, the decoder 116 may be include several decoders such as event defining characteristic 1 decoder 324, event defining characteristic 2 decoder 326, event defining characteristic N decoder 328, and event count decoder 330, wherein the encoded event objects 115 may be inputted into each decoder. In such embodiments, each decoder may decode a specific component of the encoded event objects 115. The decoded event objects 117 may be outputted from the decoder 116 and may comprise decoded event object A 332, decoded event object B 334, and decoded event object N 336. Decoded event objects 117 may then be inputted into the anomaly score determinator 118 to output the anomaly score 120.

When determining the anomaly score 120, the anomaly score determinator 118 may comprise multiple scorers such as event defining characteristic 1 scorer 332, event defining characteristic 2 scorer 334, event defining characteristic N scorer 336, and event count scorer 338. Each scorer provides a score based on a component of the event objects 112. The event objects 112 and the decoded event objects 117 may be inputted into each of the scorers to output scores. The individual scores may be provided to the total anomaly scorer 340 from each of the scorers. The scores for each scorer may be determined based on the differences between the event objects 112 and the decoded event objects 117. The total anomaly scorer 340 may then determine the total score (anomaly score 120) based on the formula described in the prior paragraph by using the outputs of the scorers. The larger the difference between the event objects 112 and the decoded event objects 117, the larger the anomaly score 120 may be.

Figure 4:
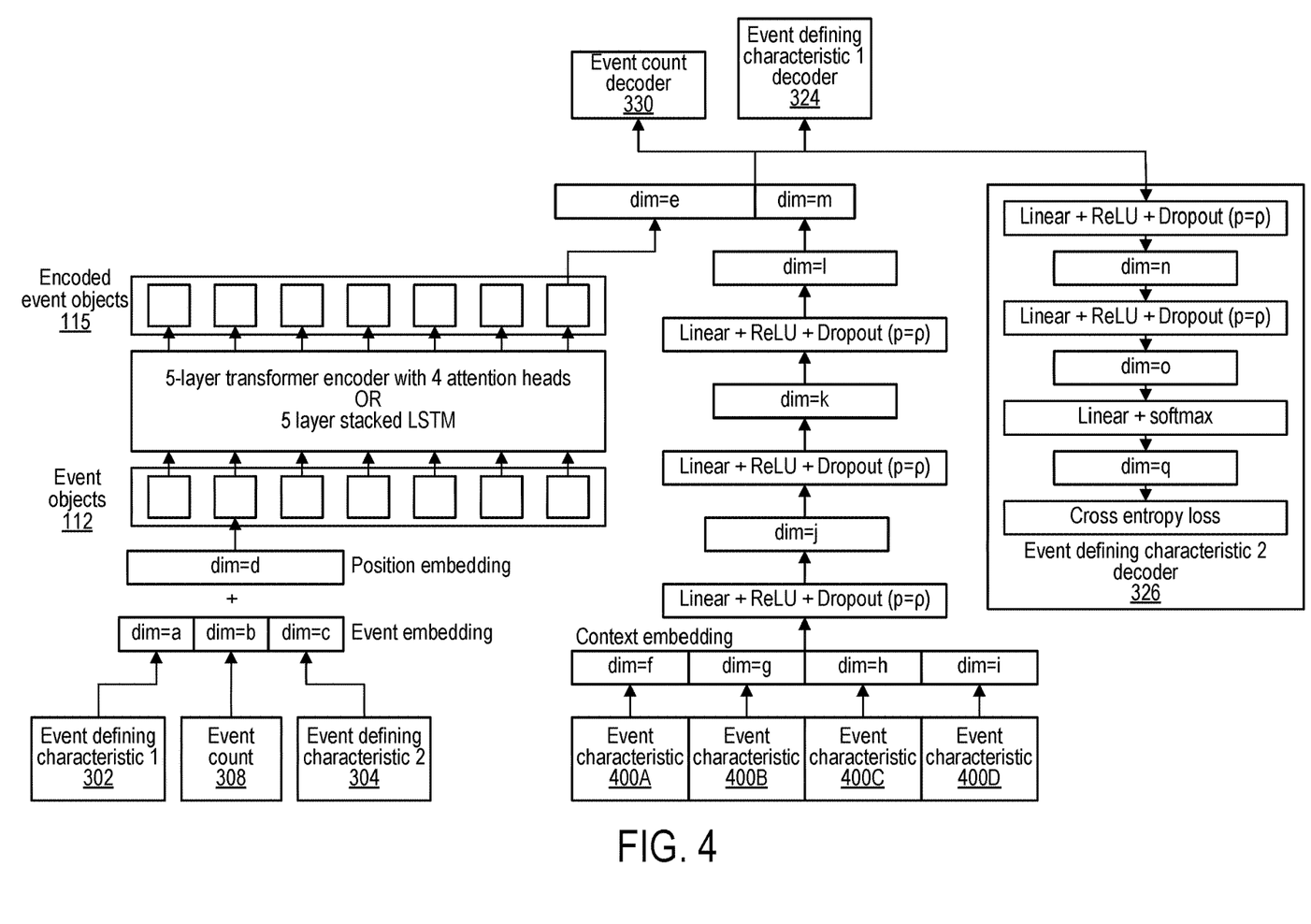
FIG. 4 is a block diagram illustrating components used to determine an anomaly score of an activity log through machine learning-based models, according to some embodiments.

FIG. 4 is a block diagram illustrating components used to determine an anomaly score of an activity log through machine learning-based models, according to some embodiments.

In some embodiments, such as shown in FIGS. 1, 2 and 3, the machine learning-based activity monitor 108 may implement further features to perform activity monitoring, such as shown in FIG. 4. When performing the encoding and decoding of the event objects 112, some embodiments may resemble FIG. 4. In some embodiments, such as in FIG. 4, "dim=" may represent the dimension of what each variable may equal. For example, "dim=a" on the event defining characteristic 1 (302) block may be the dimension of the event defining characteristic 1 (302). However, the dimensions for the variables shown in FIG. 4 are examples of one or more embodiments and are not limited to such values shown.

In some embodiments, event count decoder 330, event defining characteristic 1 decoder 324, event defining characteristic 2 decoder 326 from FIG. 3 and also shown in FIG. 4, may all comprise the components shown in the event defining characteristic 2 decoder 326.

As shown in FIG. 4, machine learning functions, "Linear+ReLU+Dropout (p=p)" as an example, may be part of the algorithms used to perform the encoding and decoding of the event objects 112 or event characteristics 400, wherein p may equal a value between 0 and 1. ReLU, rectified linear unit, may perform a piecewise linear function for use in deep learning neural networks. Dropout may act as a method for training multiple neural networks. In some embodiments, the encoder may be a 5-layer transformer encoder with 4 attention heads, or a 5-layer stacked LSTM such as shown in FIG. 4. Though in some embodiments, various other configurations may be used.

Attention heads may provide context for any position of the event objects 112, allowing the encoder to recognize the position of each component of the event objects 112. For example, the attention heads prevent an API name from being encoded the same way as an IP address. However, the encoder is not limited to the two model types. A SoftMax layer with cross-entropy loss for each decoder may be used to maximize the reconstruction probability of the segments that appeared in training data. The event characteristics 400 may be embedded as context information of the events occurring during the activity log. The context information may be used to determine the anomaly score 120. Examples of event characteristics may include, but are not limited to, username, user type, account ID, and user agent.

FIG. 5 is a block diagram illustrating a service provider network, wherein after anomalous activity monitoring is performed, a response engine outputs an event indication to send to recipients, according to some embodiments.

In some embodiments, such as shown in FIG. 1, service provider network 100 may implement further features to perform activity monitoring such as shown in FIG. 5. In some embodiments, a service 1 (102) may provide the activity log 103 of service 1 (102) to the machine learning-based activity monitor 108 to output the anomaly score 120. Such as shown in FIG. 1, multiple services may provide other activity logs to the machine learning-based activity monitor 108. The anomaly score 120 may then be sent to the response engine 110 in order to send an event indication 501 to recipients. Recipients may include recipients as described and as further described below and in FIG. 6.

FIG. 6 is a block diagram illustrating a service provider network, wherein after security service monitoring is performed, a response engine outputs information to services in the service provider network and to another separate network that communicates with the service provider network and clients, according to some embodiments.

In some embodiments, such as shown in FIGS. 1 and 5, service provider network 100 may implement further features to perform activity monitoring such as shown in FIG. 6. In some embodiments, the service provider network 100 may comprise a provider network security service 610, a virtual computer service 600, stream processing service 602, storage service 604, database service 606, and other network-based services 608. In such embodiments, the provider network security service 610 may include the machine learning-based activity monitor 108, an antivirus scanner 612, and other security monitors 614 for the purpose of monitoring activity. The antivirus scanner 612 and the other security monitors 614 may be used together with the machine learning-based activity monitor 108 to perform security services for services or clients.

The machine learning-based activity monitor 108, the antivirus 612, and the other security monitors 614 may provide information to a response engine 110, such as an indication of anomalous activity as described in FIG. 5. In some embodiments, in response to the information, the response engine 110 may provide information to the virtual computer service 600, stream processing service 602, storage service 604, database service 606, other network-based service 608, and/or an outside network 616 that communicates with the service provider network and clients. Such services are examples of possible services in a service provider network but the service provider network 100 is not limited to only these services.

Figure 7:
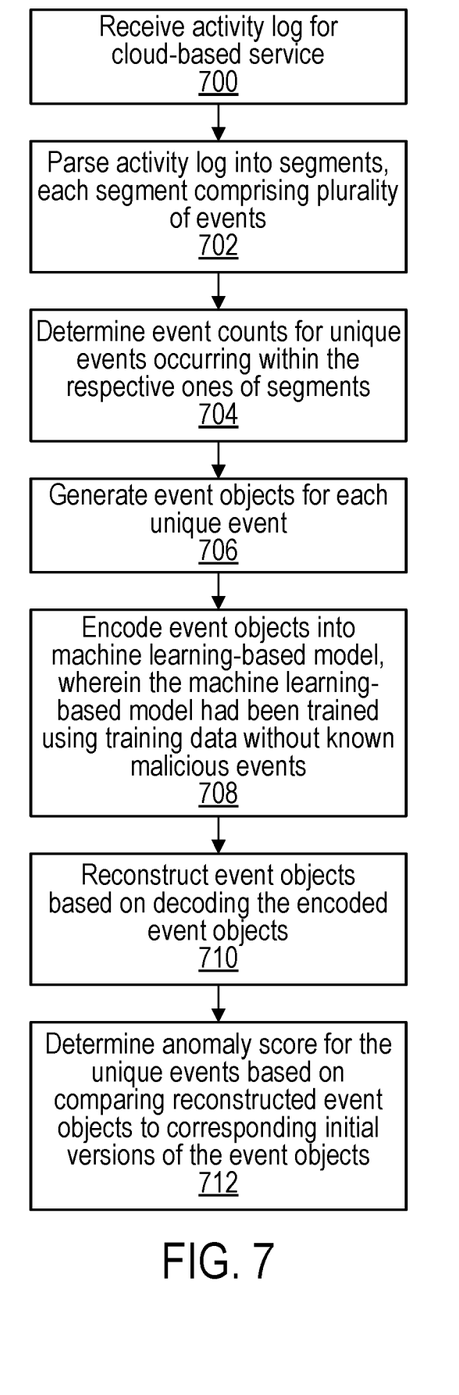
FIG. 7 is a flow diagram illustrating a process for performing machine learning-based activity monitoring that determines an anomaly score for an activity log based on comparing event objects of the activity log to decoded event objects of the activity log, according to some embodiments.

FIG. 7 is a flow diagram illustrating a process for performing machine learning-based activity monitoring that determines an anomaly score for an activity log based on comparing event objects of the activity log to decoded event objects of the activity log, according to some embodiments.

In some embodiments, a process of performing activity monitoring to determine an anomaly score may resemble a process such as that which is shown in FIG. 7. In block 700, an activity log may be received for a cloud-based service by a machine learning-based activity monitor. For example, a service may provide an activity log to the machine learning-based activity monitor. In block 702, the machine learning-based activity monitor may parse the activity log into segments, each segment comprising a plurality of events. In block 704, event counts for unique events occurring with the respective segments may be determined. For example, if during a segment a file was moved to a location and this event occurred 5 times, then the event count would equal 5.

In block 706, an event object may be generated for each unique event. In some embodiments, for example, the event objects 112 shown in FIG. 3 may be generated and may include event defining characteristics, event characteristics (e.g., contextual characteristics) and an event count. In block 708, the event objects may be concurrently encoded into a machine learning-based model, that has been trained using training data without any known malicious events, such as shown in FIG. 1 and FIG. 3. In block 710, the event objects may be reconstructed based on decoding the encoded event objects, such as shown in FIG. 1 and FIG. 3. In block 712, the anomaly score may be determined for the unique events based on comparing reconstructed event objects to corresponding initial versions of the event objects such as shown in FIG. 3. A higher anomaly score may be represented by greater differences between the reconstructed event objects and the initial versions of the event objects.

Figure 8:
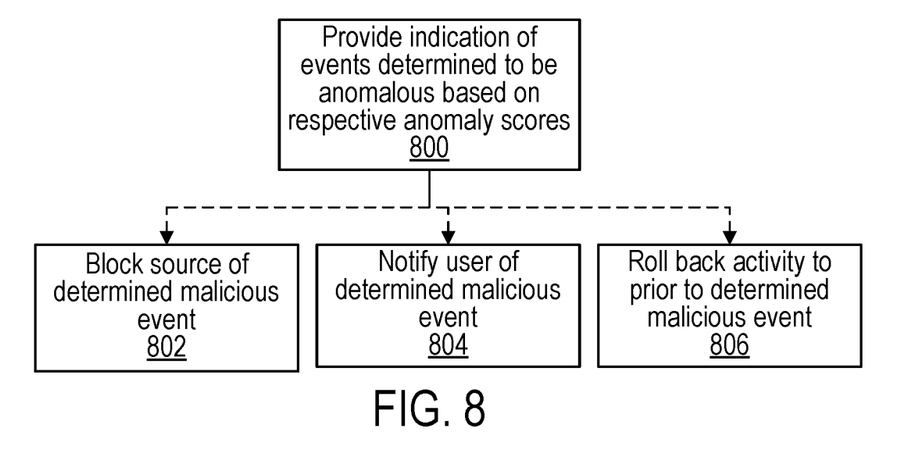
FIG. 8 is a flow diagram illustrating a process of providing an indication of events determined to be anomalous based on an anomalous score to a response engine, according to some embodiments.

FIG. 8 is a flow diagram illustrating a process of a response engine providing an indication of events determined to be anomalous based on an anomalous score, according to some embodiments.

In some embodiments, a process of responding to the determined anomaly score may resemble a process such as that which is shown in FIG. 8. The dashed lines in FIG. 8 represent possible choices the process may follow but is not limited to only these choices. The blocks following the dashed lines may occur independently from each other, in succession to each other, or at the same time. In block 800, an indication of events determined to be anomalous based on respective anomaly scores may be provided to recipients such as shown in FIG. 5. For example, recipients may comprise a virtual computer service, a stream processing service, a storage service, a database service, other network-based services, and/or outside networks, such as shown in FIG. 6.

In block 802, the source of the determined malicious events may be blocked. For example, if the determined malicious events occurred from a specific IP address, then the IP address may be blocked from accessing the service the malicious events occurred on. In block 804, a user of a given service may be notified of the determined malicious event. An example of an indication may be a pop-up notification informing the user of the anomalous activity or an email sent to an administrator associated with the service. In block 806, activity may be rolled back to prior to determined malicious event. For example, if thousands of files being deleted were determined to be malicious events, then the files may be placed back into their original folders like they were before the files were deleted.

Figure 9:
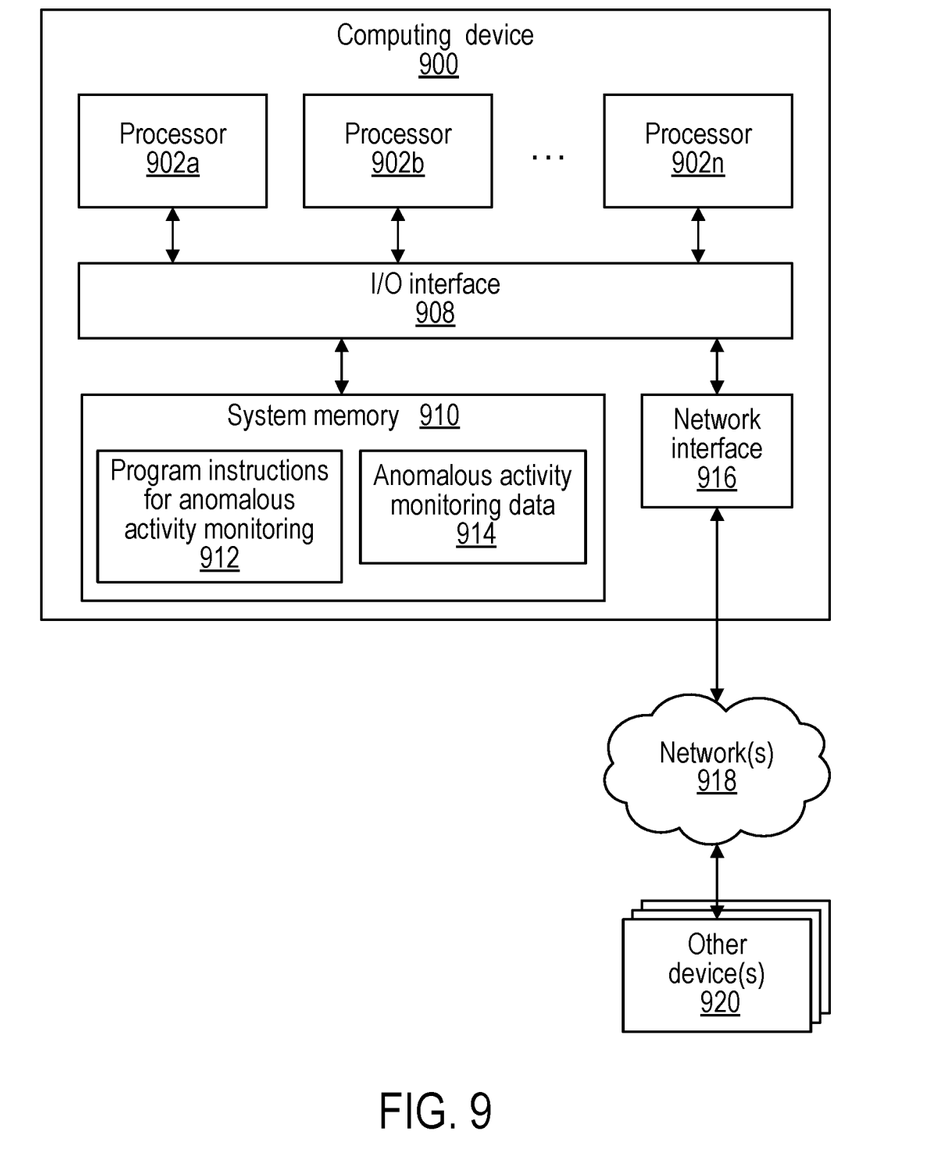
FIG. 9 is a block diagram illustrating an example computer system that implements portions of the anomalous activity monitoring described herein, according to some embodiments.

FIG. 9 is a block diagram illustrating an example computer system that implements portions of the anomalous activity monitoring described herein, according to some embodiments.

FIG. 9 is a block diagram illustrating an example computing device that may be used in at least some embodiments. In at least some embodiments, a server that implements a portion or all of one or more of the technologies described herein, including the techniques for detection of malicious events, may include a general-purpose computer system that includes or is configured to access one or more computer-accessible media. FIG. 9 illustrates such a general-purpose computing device 900. In the illustrated embodiment, computing device 900 includes one or more processors 902 coupled to a system memory 910 (which may comprise both non-volatile and volatile memory modules) via an input/output (I/O) interface 908. Computing device 900 further includes a network interface 916 coupled to I/O interface 908.

In various embodiments, computing device 900 may be a uniprocessor system including one processor 902, or a multiprocessor system including several processors 902 (e.g., two, four, eight, or another suitable number). Processors 902 may be any suitable processors capable of executing instructions. For example, in various embodiments, processors 902 may be general-purpose or embedded processors implementing any of a variety of instruction set architectures (ISAs), such as the x86, PowerPC, SPARC, or MIPS ISAs, or any other suitable ISA. In multiprocessor systems, each of processors 902 may commonly, but not necessarily, implement the same ISA. In some implementations, graphics processing units (GPUs) may be used instead of, or in addition to, conventional processors.

System memory 910 may be configured to store instructions and data accessible by processor(s) 902. In at least some embodiments, the system memory 910 may comprise both volatile and non-volatile portions; in other embodiments, only volatile memory may be used. In various embodiments, the volatile portion of system memory 910 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery).

In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 910 as program instructions for anomalous activity monitoring 912 and anomalous activity monitoring data 914.

In one embodiment, I/O interface 908 may be configured to coordinate I/O traffic between processor 902, system memory 910, and any peripheral devices in the device, including network interface 916 or other peripheral interfaces such as various types of persistent and/or volatile storage devices. In some embodiments, I/O interface 908 may perform any necessary protocol, timing or other data transformations to convert data signals from one component (e.g., system memory 910) into a format suitable for use by another component (e.g., processor 902). In some embodiments, I/O interface 908 may include support for devices attached through various types of peripheral buses, such as a variant of the Peripheral Component Interconnect (PCI) bus standard or the Universal Serial Bus (USB) standard, for example. In some embodiments, the function of I/O interface 908 may be split into two or more separate components, such as a north bridge and a south bridge, for example. Also, in some embodiments some or all of the functionality of I/O interface 908, such as an interface to system memory 910, may be incorporated directly into processor 902.

Network interface 916 may be configured to allow data to be exchanged between computing device 900 and other devices 920 attached to a network or networks 918, such as other computer systems or devices as illustrated in FIG. 1 through FIG. 8, for example. Additionally, network interface 916 may support communication via telecommunications/telephony networks such as analog voice networks or digital fiber communications networks, via storage area networks such as Fibre Channel SANs, or via any other suitable type of network and/or protocol.

In some embodiments, system memory 910 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 900 via I/O interface 908. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 900 as system memory 910 or another type of memory.

In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 916.

Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:
   one or more computing devices configured to implement a cloud-based service; and
   one or more computing devices configured to implement a machine learning-based activity monitor for the cloud-based service, wherein to implement the machine-learning-based activity monitor, the one or more computing devices are configured to:
   receive an activity log for the cloud-based service;
   parse the activity log into a plurality of segments, each segment comprising a plurality of events;
   determine, for respective ones of the segments, event counts for unique events occurring within the respective ones of the segments;
   generate event objects for respective ones of the unique events occurring within the respective ones of the segments, wherein the event objects comprise an event identifier and an associated event count for a given one of the unique events;
   encode the event objects into a machine learning-based model, wherein the machine learning-based model has been trained using training data without known malicious events;
   reconstruct the event objects for the respective ones of the unique events based on decoding the encoded event objects corresponding to the respective ones of the unique events;
   determine an anomaly score for the respective ones of the unique events based on comparing the respective reconstructed event objects to corresponding initial versions of the respective event objects prior to the encoding; and
   provide an indication of events determined to be anomalous based on the respective anomaly scores.

2. The system of claim 1, wherein the unique event having the corresponding event identifier is determined based on at least two event defining characteristics that form a unique combination different from combinations of event characteristics of other events in the segment.

3. The system of claim 2, wherein the event characteristics comprise one or more of: an IP address, a username, an error code, an API name, a user type, an account ID, or a user agent.

4. The system of claim 2, wherein the event characteristics for the unique event comprise the at least two event defining characteristics and one or more event context characteristics of the unique event, wherein the one or more event context characteristics are encoded as context information to be used in the determination of the anomaly score.

5. The system of claim 4, wherein to parse the activity log into a plurality of segments, the one or more computing devices are further configured to:
   identify an activity originator for each of the plurality of events based on the event characteristics, and
   parse the activity log into the plurality of segments, wherein the plurality of segments comprises different respective sets of segments, and wherein the different respective sets of segments each comprise activities associated with a given one of the activity originators.

6. One or more non-transitory computer-readable storage media storing program instructions that, when executed on or across one or more processors, implement a machine learning-based activity monitor for a cloud-based service and cause the machine learning-based activity monitor to:
   determine, for respective ones of a plurality of segments of an activity log, event counts for unique events occurring within the respective ones of the segments;
   generate event objects for respective ones of the unique events, wherein respective ones of the event objects comprise an event identifier and an associated event count for a respective one of the unique events;
   encode the event objects into a machine learning-based model, wherein the machine learning-based model has been trained using training data without known malicious events;
   reconstruct the event objects for the respective ones of the unique events based on decoding the encoded event objects corresponding to the respective ones of the unique events; and
   determine an anomaly score for the respective ones of the unique events based on comparing the respective reconstructed event objects to corresponding initial versions of the respective event objects prior to the encoding.

7. The one or more non-transitory computer-readable storage media of claim 6, wherein the unique event having the corresponding event identifier is determined based on at least two event defining characteristics that form a unique combination different from combinations of event characteristics of other events in the segment.

8. The one or more non-transitory computer-readable storage media of claim 7, wherein the event characteristics for the unique event comprise the at least two event defining characteristics and one or more event context characteristics of the unique event, wherein the one or more event context characteristics are encoded as context information to be used in the determination of the anomaly score.

9. The one or more non-transitory computer-readable storage media of claim 6, wherein differences between the reconstructed event objects and the initial versions of the event objects indicate anomalous activity and increase the anomaly score.

10. The one or more non-transitory computer-readable storage media of claim 6, wherein the event objects are encoded concurrently into the machine learning-based model, and wherein the reconstructed versions of the event objects are reconstructed using decoded versions of the event objects that have been concurrently encoded into the machine learning-based model.

11. The one or more non-transitory computer-readable storage media of claim 6, wherein the program instructions when executed on or across the one or more processors, further cause the machine learning-based activity monitor to:

provide an indication of events determined to be anomalous based on the respective anomaly scores.

12. The one or more non-transitory computer-readable storage media of claim 11, wherein the indication comprises a malicious event notification.

13. The one or more non-transitory computer-readable storage media of claim 11, wherein the indication causes a source of a malicious event to be blocked.

14. The one or more non-transitory computer-readable storage media of claim 6, wherein a length of the segment is defined by a set time period of the activity log.

15. The one or more non-transitory computer-readable storage media of claim 6, wherein a length of the segment is defined by a set number of events.

16. The one or more non-transitory computer-readable storage media of claim 6, wherein the machine-learning-based model is a transformer model.

17. The one or more non-transitory computer readable storage media of claim 8, wherein the event context characteristics are encoded into a different machine learning-based model from the machine learning-based model used to encode the event objects defined by the at least two event defining characteristics.

18. The one or more non-transitory computer readable storage media of claim 6, wherein a total anomaly score is determined by summing the respective anomaly scores for the at least two event defining characteristics and the event count that define the unique events, and wherein the respective anomaly scores for the at least two event defining characteristics and the event count are divided by respective threshold values for the at least two event defining characteristics and the event count corresponding to the respective anomaly scores.

19. A method, comprising:

determine, for respective ones of a plurality of segments of an activity log, event counts for unique events occurring within the respective ones of the segments;

generating event objects for respective ones of the unique events occurring within the respective ones of the segments, wherein the event objects comprise an event identifier and an associated event count for a given one of the unique events;

encoding the event objects into a machine learning-based model, wherein the machine learning-based model has been trained using training data without known malicious events;

reconstructing the event objects for the respective ones of the unique events based on decoding the encoded event objects corresponding to the respective ones of the unique events; and determining an anomaly score for the respective ones of the unique events based on comparing the respective reconstructed event objects to corresponding initial versions of the respective event objects prior to the encoding.

20. The method of claim 19, further comprising:

training the machine learning-based model using past activity logs without known malicious events to teach the machine learning-based model expected non-malicious activity.

\* \* \* \* \*